June 26, 1945.　　　　K. RATH　　　　2,379,103
VISUAL PHOTOGRAPHIC EXPOSURE METER
Filed Nov. 18, 1943　　　2 Sheets-Sheet 1
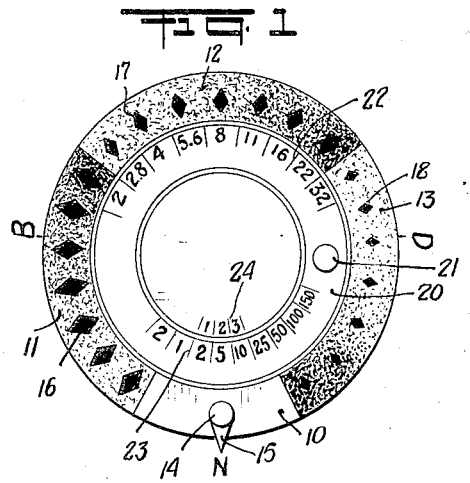
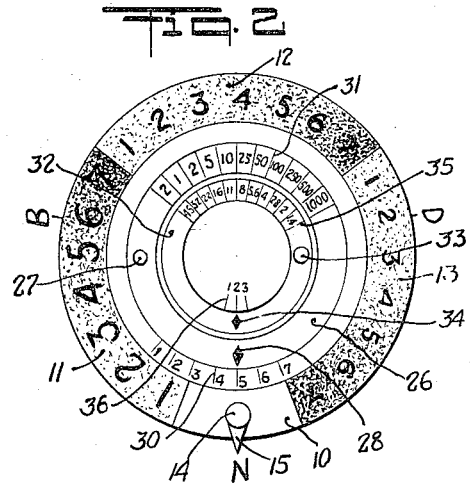
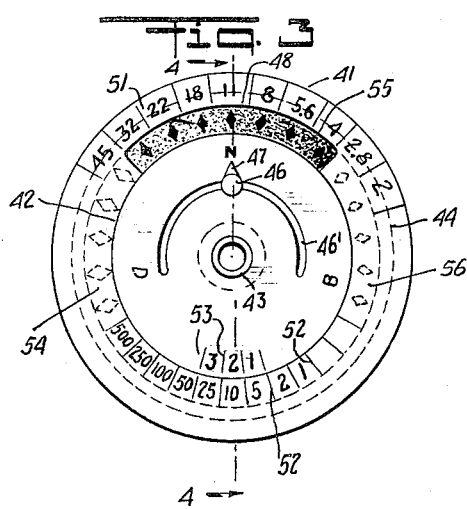
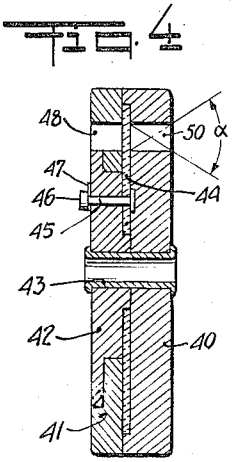
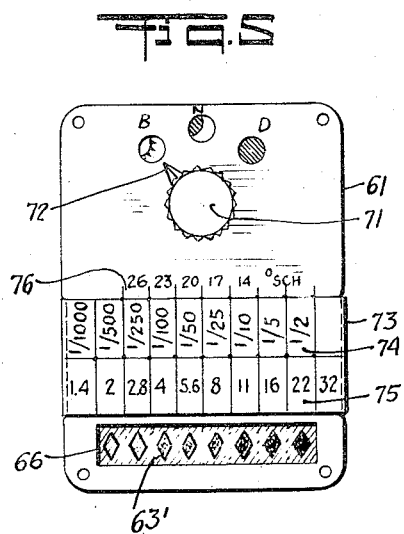
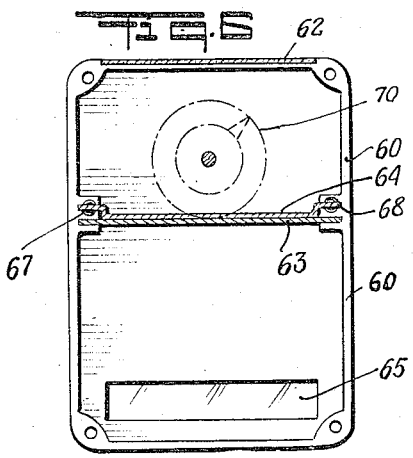
INVENTOR.

June 26, 1945.   K. RATH   2,379,103
VISUAL PHOTOGRAPHIC EXPOSURE METER
Filed Nov. 18, 1943    2 Sheets-Sheet 2
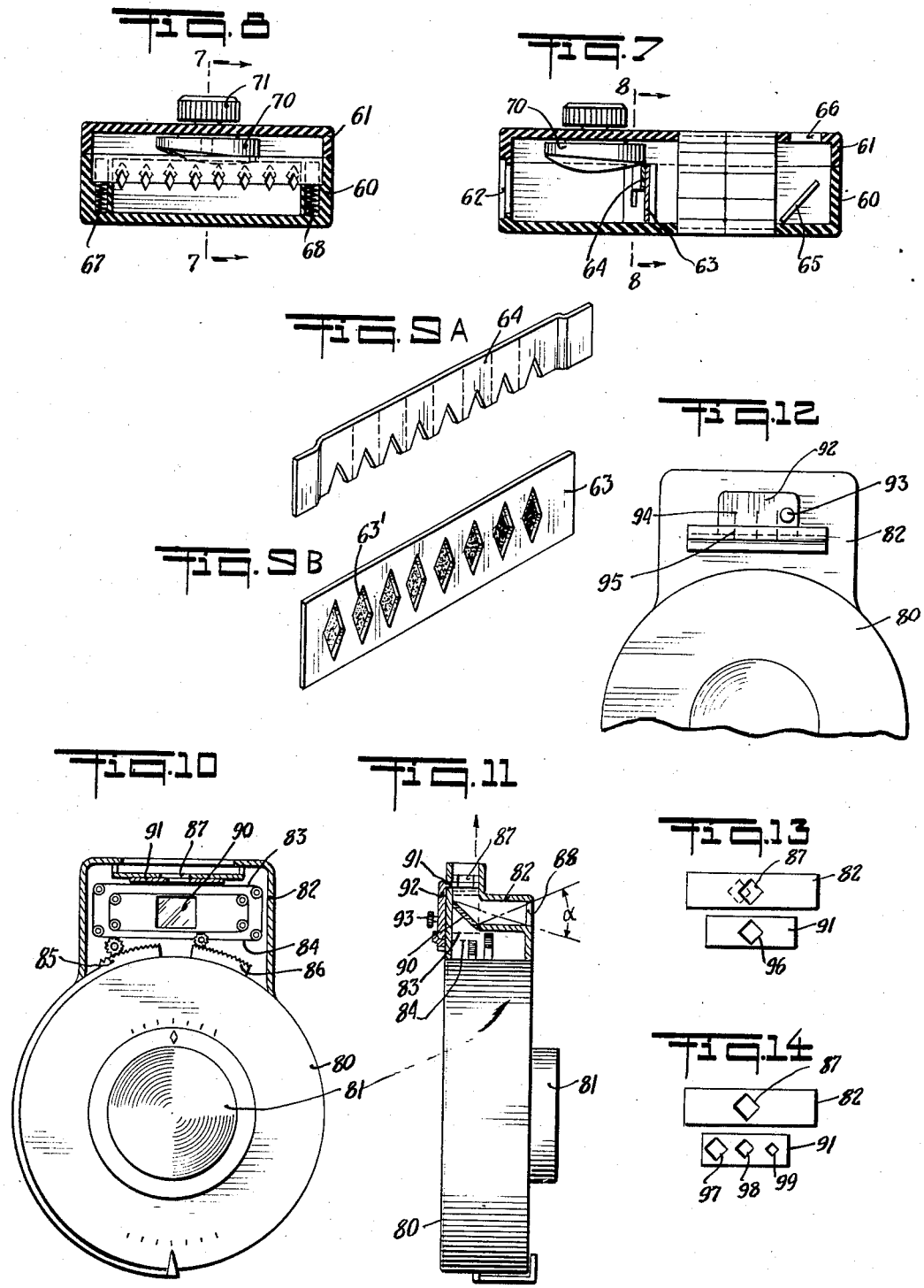
INVENTOR.

Patented June 26, 1945

2,379,103

UNITED STATES PATENT OFFICE 2,379,103

VISUAL PHOTOGRAPHIC EXPOSURE METER

Karl Rath, New York, N. Y.

Application November 18, 1943, Serial No. 510,728

10 Claims. (Cl. 88—23)

This application is a continuation in part of my copending applications Ser. No. 414,058 filed October 8, 1941, now Patent No. 2,340,141 and entitled "Visual exposure meter," and Ser. No. 423,613 filed December 19, 1941, now Patent No. 2,342,061 and entitled "Extinction type exposure determining device."

The present invention relates to extinction type visual exposure meters utilizing a light gauge element of the type comprising at least one light pervious or translucent test mark or area illuminated by light rays emanating from a photographic scene or object and arranged adjacent to a substantially opaque or standard area, whereby the relative brightness or contrast between both said areas is an index of the existing scene or object brightness.

This relative brightness or contrast may be determined and translated into the proper exposure adjusting values of a camera in various manners well known in the art. One common method, in case of using a single pair of test and standard areas, consists in reducing or dimming the light rays impinged upon the test area by the aid of a suitable dimming device (iris diaphragm, graduated optical wedge) to a point where the outline of or relative brightness of the test mark or area with respect to the adjacent standard area becomes just barely visible or extinguished. The extent of adjustment of the dimming device necessary to effect this disappearance or extinction is then a measure of the scene or object brightness and may be translated into appropriate exposure adjusting values by coupling said dimming device with an adjustable scale member of a suitable converter or calculator or directly with an adjustable exposure control organ of a camera.

Another known method of constructing and operating extinction type exposure meters consists in the provision of a plurality of adjacently situated test marks or areas of increasingly varying density or contrast relative to their surrounding areas, preferably in the form of an opaque background, whereby with all said marks or areas being simultaneously illuminated by light rays emanating from the scene or object to be photographed, the mark just barely visible or merging into its background, or rather the distance of this mark from one end of the series or row of marks, will be representative of the scene or object brightness to be determined. In a common construction of this type, the marks are identified by a series of numbers or the like representing a brightness scale serving as a basis for translation into the proper exposure adjusting values by the aid of a calculator or in any other manner known in the art.

The present invention has for its object generally to improve the design and operation of extinction type exposure meters of the above character by enabling additional exposure controlling factors, such as film speed or emulsion sensitivity, filter factors and in particular the effect of the varying eye sensitivity to be considered in a simple and reliable manner.

With this and further objects in view, the invention contemplates the provision of means in connection with an extinction type light gauge element having at least one light pervious test area and an adjacent preferably opaque standard area, whereby the normal or initial contrast between said marks or areas is variable or adjustable to consider additional factors entering into the light measurement and final exposure determination.

Thus, in a preferred mode of carrying out the invention, the opacity or density of the test area is varied or adjusted for determining the light intensity or scene brightness in any manner known, while the size of the mark or marks is adjusted according to one or more additional exposure controlling factors to be considered in the final exposure determination or control. Although opacity and size are the main characteristics determining relative contrast of a mark or area with respect to an adjacent or standard area and are utilized in the preferred embodiment of the invention described in the following, other characteristics of the marks, such as shape or configuration, color, etc. may be utilized for the purpose of the invention, as will be readily understood.

The above and further objects and novel aspects of the invention will become more apparent from the following detailed description taken in reference to the accompanying drawings forming part of this specification and wherein:

Figure 1 is a front view schematically illustrating one form of an extinction type exposure meter embodying the principle of my invention; Figure 2 illustrates a modification of Figure 1; Figure 3 is a front view of a practical exposure meter construction of the type shown in Figure 1; Figure 4 is a sectional view taken on line 4—4 of Figure 3; Figure 5 is a top view of a meter according to a further modification of the invention; Figure 6 is a view similar to Figure 5 with the cover removed therefrom; Figure 7 is a longitudinal cross section of the meter shown in Figure 5 and taken on line 7—7 of Figure 8; Figure 8 is a cross-section taken on line 8—8 of Figure 7; Figures 9A and 9B are perspective detail views showing the elements comprising the photometric wedge construction in Figures 5 to 8; Figure 10 is a cross section of a photographic shutter structurally combined with an exposure meter according to the invention; Figure 11 is a side view partly in cross section of Figure 10; Figure 12 is a front view of the meter shown in Figure 10; and Figures 13 and 14 are detail views of parts embodied in the meter shown in Figures 10 and 11.

Like reference numerals identify like parts throughout the different views of the drawings.

Referring to Figure 1, I have shown at 10 a ring shaped member of transparent or translucent material, such as Celluloid, cellulose acetate or the like, having applied thereto three arc shaped photometric wedges 11, 12 and 13, each having an opacity or density varying gradually from one end to the other in the manner shown and well understood. Each wedge has applied to it a series of adjacently situated test marks or areas 16, 17 and 18, respectively, of any desired shape. In the example shown, these marks are of diamond shape and light impervious or opaque with respect to the surrounding areas or background constituting the graduated wedge elements. In a preferred alternative arrangement, as shown in Figure 5, the surrounding areas of the marks or background are opaque, while the marks themselves are of progressively increasing density or opacity in a manner well known in the construction of visual exposure meters of this type.

According to the present invention, the size of the marks is different for each wedge, wedge 11 having marks 16 of a relatively large size, wedge 12 having marks 17 of medium size and wedge 13 having marks 18 of relatively small size. The member 10 is arranged for rotation by means of a knob 14 having an index 15 arranged for adjustment opposite to fixed stationary identification marks B, N and D representing the general lighting conditions such as bright, normal and dull surroundings, respectively. I have furthermore shown an adjustable ring shaped scale member 20 arranged inside the member 10 and having an adjusting knob 21. Scale member 20 is provided with a pair of adjacent scales 22 and 23 representing lens aperture or stop values and exposure times, respectively, one of said scales, that is the stop scale 22 in the example shown, being arranged adjacent to one of the wedges 11, 12 and 13, depending upon the adjustment of member 10. The other scale 23 on member 20 is arranged to cooperate with a stationary scale 24 representing film or emulsion speed values. In the example shown the numbers 1, 2 and 3 representing low, medium and high speed films correspond to a difference in sensitivity equal to a change from one to the next graduation of scales 22 and 23 in terms of exposure.

An arrangement according to Figure 1 constitutes a "direct reading" extinction type exposure meter described more fully in my U. S. Patent No. 2,323,696, issued July 6, 1943, in that the adjustment of member 20 according to a preselected exposure time and film speed by causing the respective numbers on scales 23 and 24 to be opposite each other (such as a film speed 3 and exposure $\frac{1}{10}$ sec. in the example of the drawings), will enable an immediate and direct reading of the proper coordinated stop or lens aperture on scale 22 without requiring any additional adjustment or manipulation prior to the taking of a picture. For this purpose, all that is necessary is to properly point the meter in the direction of the object or scene to be photographed so that the wedge adjacent to scale 22 (wedge 12 in the example shown) is illuminated by light emanating from said scene or object, and to observe the number on scale 22 appearing opposite to the marks 17 on the wedge being just barely visible or merging into its background. In Figure 1, this mark is the one opposite to the number 22 on scale 22, indicating that a stop F 22 will be required in order to obtain a correctly exposed photograph.

In Figure 1, a high illumination or scene brightness has been assumed. For lower brightness values, a mark further to the left will be just barely visible corresponding to a lower stop or lens aperture as is understood. It is noted that as long as the same shutter speed is used, a practice preferred by most photographers, the proper stop may be read instantly without any adjustment or manipulation prior to the taking of a picture.

Extinction type exposure meters using a light gauge element operated or read visually, such as shown in Figure 1, are subject to a serious error due to the varying sensitivity of the observer's eye depending on the general or average lighting conditions or illumination to which the eye is exposed. This is due to the fact that the eye responds logarithmically rather than linearly as the light intensity is increased whereby the capacity of the eye to distinguish between detail or contrast decreases as the light intensity on the retina increases. This phenomenon results in a serious error and corresponding wrong exposures when using a visual light gauge of the type described as a brightness meter.

It has already been proposed to minimize this defect by excluding all extraneous light from the eye by the provision of a shield or cup to be pressed firmly against the eye in the reading position to render the reading independent of the general lighting conditions surrounding the observer. However, for reasons which need not be discussed, meters without an eye cup and held at a distance from the eye, have become very popular in view of their simple and instantaneous operation and means have already been proposed to consider or compensate for the varying eye sensitivity in the final exposure data obtained.

The present invention, as pointed out hereinabove, provides a most simple and efficient means to consider the varying eye sensitivity. In Figure 1, this is accomplished by varying the normal or average contrast between the marks on the light gauge wedge and the surrounding area or background. In the position shown in Figure 1, wedge 12 having marks 17 of a medium size is in the operative position, that is opposite to the scale 22 on member 20. This corresponds to a medium illumination or normal average lighting conditions indicated by the index 15 being opposite to the letter N (normal) corresponding for instance, to a lightly clouded sky or average sunshine conditions.

If now the general light conditions change in the bright direction, such as to bright sunshine on seashores, etc. the decreased eye sensitivity will result in the disappearance of a mark further to the left on wedge 12 and accordingly an over-exposed picture. This error is eliminated according to the invention by rotating member 10 until wedge 11 is brought into the operative position opposite to scale 22 as indicated by the index 15 being opposite to the letter B (bright) or any other designation. With the wedge 11 and marks 16 of increased size or relative contrast being used for the light measurement, the mark just barely visible will again be shifted to the right in such a manner as to compensate for the eye sensitivity when using wedge 12.

If the general conditions change in the dark direction, such as to a heavily clouded sky or dull surroundings, member 10 is adjusted to bring the wedge 13 opposite to the scale 22 indicated by the index 15 coinciding with the letter D (dull). Without this adjustment, the increased eye sensitivity would result in too great a brightness reading or an under-exposed picture. This error is compensated by a reduced normal contrast between the marks 18 of smaller size and the background or surrounding areas. In the aforementioned description, it has been assumed that the scene or object brightness has remained constant and that only the general lighting conditions affecting the eye sensitivity have changed. Practice has shown that it will take only a short time for the photographer to correctly judge the general lighting conditions within reasonable limits to insure a proper correction of the eye sensitivity error under practically any circumstances.

Figure 2 is substantially similar to Figure 1 as far as the compensation of the eye sensitivity error is concerned. This meter differs however from Figure 1 in that it is of the so-called adjusting type and will enable any pair of coordinated stop and exposure time values to be selected from a separate calculator to be adjusted prior to each exposure determination. For this purpose, the marks 16, 17 and 18 of Figure 1 take the form of brightness scales comprising units 1 to 7 and representing scene or object brightness according to any suitable system. The brightness number read on the wedge in the central or operative position (wedge 12 in Figure 2) is then translated into the proper exposure adjusting values by the aid of a separate calculator or conversion device comprising, in the example shown, a first adjustable ring shaped scale member 26 having an adjusting knob 27 and an index 28, the latter being arranged to cooperate with a fixed scale 30 representing brightness values and being identical to the scales on the wedges 11, 12 and 13. Scale member 26, also carries a scale 31 representing exposure times. There is furthermore shown in the example illustrated, an adjustable scale member 32 having an adjusting knob 33 and an index 34 arranged to cooperate with a stationary scale 36 representing film speeds. Scale number 32 is provided with a further scale 35 representing stop or lens aperture values and arranged adjacent to and cooperating with the exposure time scale 31 on member 26.

In operation, member 26 is adjusted until its index 28 is opposite to the scene brightness number on scale 30 and read off the wedge 12, member 32 having been previously adjusted so that its index 34 is opposite to the proper speed number on scale 36 for the film or plate used in the camera. In this manner, scales 31 and 35 will be properly aligned so that any desired coordinated pair of stop and exposure time may be selected for setting the camera shutter to obtain a correctly exposed picture. The varying eye sensitivity is again considered in the same manner as in Figure 1 by using the proper wedge 11, 12 and 13 the brightness numbers of which vary in size in substantially the same manner as the marks 16, 17 and 18 in Figure 1. Any other known exposure meter arrangement, however, may be used in connection with the invention embodying suitable means for varying the size or average contrast of the test mark or marks to consider additional exposure controlling factors such as the varying eye sensitivity in a manner readily understood from the foregoing.

Figures 3 and 4 illustrate a practical construction of an exposure meter of the type according to Figure 1. This meter comprises a circular base member 40 and a ring shaped rotatable scale member 41 held by a central member 42 secured to the member 40 by a rivet 43 or in any other suitable manner. Members 41 and 42 are provided with dovetailing annular flanges or extensions whereby the surfaces of the members will be flush with each other and member 41 is held in rotating relation with respect to the members 40 and 42. Item 44 is a disc of Celluloid or the like provided at its periphery with three arc shaped photometric wedges and mounted within a suitable depression or annular recess in the member 40. Disc 44 may be rotated to different positions marked D, N and B upon the surface of member 42 and for this purpose has affixed to it a rod or shaft 45 terminating in a knob 46 and index 47 and projecting beyond the surface of member 42. Rod 45 moves within an arcuate slot 46' and in the member 42.

Members 40 and 42 are provided with registering arcuate slots 50 and 48, respectively, coinciding with any one of the wedges 54, 55 and 56 on the disc 44 depending on the adjustment of the latter by the knob 46 and position of the index 47 opposite to the letters D, N and B, respectively. Member 41 carries a first stop or lens aperture scale 51 near its periphery adjacent to the slot 48 and the wedge 55 appearing therein and a second scale 52 representing exposure times upon its lower part, said last scale being arranged adjacent to and in cooperative relation to a third scale 53 applied to the member 42 and representing film or emulsion speeds.

Slot 50 is designed to have a suitable depth whereby to result in a limited acceptance angle for the light wedge corresponding substantially to the average picture or view angle of photographic cameras (about 45°), whereby to cause only light rays that emanate from the scene or object to be photographed to illuminate the light gauge wedge and to prevent extraneous light from erroneously affecting the scene brightness measurement and in turn the exposure. In a construction of this type only one of the wedges on the disc 44 in the operative position will be visible in the viewing slot, the operation of the meter being otherwise substantially the same as described in connection with Figure 1.

Referring to Figures 5 to 9, I have shown a further embodiment of an exposure meter enabling the taking into account of the varying eye sensitivity in a simple and easy manner in accordance with the invention. The meter shown according to this embodiment is of substantially the same type as that according to Figure 1, having a rectangular rather than a circular shape as in case of Figure 1. This meter comprises a rectangular housing comprising a bottom portion 60 and a top or cover 61, a light admitting opening in the front of said housing advantageously covered by a diffusing plate 62, a wedge element comprising members 63 and 64 to be described presently mounted in said housing and a reflector or mirror 65 to deflect the light bundle or beam originating from the photographic scene and entering the meter through plate 12 and wedge 63, 64 towards the viewing slot or aperture 66 provided at the rear of the top wall or cover 61.

The two elements 63 and 64 of the wedge are shown more clearly in Figures 9A and 9B, the latter being a fixed or stationary element provided with marks 63' and gradually increasing density and the former having triangular recesses or notches forming a mask cooperating with said marks to vary their size by adjusting member 64 relative to member 63. For this purpose, I have shown means to displace member 64 in a downward direction so as to partly cover the marks on the wedge member 63 or in other words to vary the size or average contrast of the marks 63' relative to their surrounding area. In the example shown, member 64 is suitably guided in the side walls of the housing and rests upon resilient members in the form of coil springs 67 and 68 or the like arranged in suitable recesses of the housing. Item 70 is a cam having a shaft journalled in the top wall of the cover 61 and carrying an adjusting knob 71. The latter is provided with pointer or index 72 movable in cooperative relation to three or more calibration marks, D, N and B identifying the general light conditions in the manner described hereinabove.

In operation, by turning the knob 71, cam 70 engaging the upper edge of mask 64, will push the latter in a downward direction against the action of the springs 67 and 68, whereby to reduce the effective size of the test marks in the manner described. The shaft of cam 70 engages the cover 11 with sufficient friction substantially exceeding the force of the springs 67 and 68 to hold the cam in any adjusting position. The arrangement is such that for low eye sensitivity (bright or sunny days) the test marks on the photometric wedge have their greatest size and that for high eye sensitivity (dull day, interiors, etc.) the marks assume a smaller size by properly adjusting the knob 71 in such a manner as to compensate for the varying eye sensitivity by a corresponding variation of the relative contrast of the test marks in a manner readily understood from the foregoing.

Item 73 is an endless scale member passing around the meter casing and provided with exposure time and stop scales 74 and 75, respectively, the latter being located adjacent to the viewing slot 66. Scale member 74 is arranged to cooperate with a fixed film speed scale 76 representing well known Scheiner degrees, the construction and operation being otherwise substantially the same as shown in Figures 1 to 3.

Referring to Figures 10 to 14, I have shown a further embodiment of the invention especially suitable for meters of the type comprising a single test mark adjacent to an opaque standard area and adjustable light dimming means for equalizing brightness of said areas in carrying out a scene brightness measurement. The meter shown is furthermore of the type directly connected with the exposure control organs of a camera shutter to effect an exposure control without the necessity of reading scales or translating the brightness indication into exposure controlling values.

In the example shown in Figures 10 to 14, item 80 represents the shutter of a camera mounted in a known manner around the lens 81 and provided with an upper extension or housing 82 enclosing the exposure meter elements. The latter, in the example shown, comprise a pair of endless photometric wedges 83 and 84 passing over suitable guide rollers and each coupled with one of the lens aperture and exposure time adjustments in any suitable manner, such as by way of gears or sprockets engaging marginal perforations in the wedges 83 and 84 on the one hand and a pair of racks 85 and 86 connected with the shutter adjustments on the other hand as shown in the drawings. A small area of the wedges 83 and 84 having a gradually increasing density or opacity is visible through a window 87 in the depressed central portion of the top wall of housing 82.

The light bundle emanating from the scene or object in the operative position of the camera enters the window or diffusing plate 88 mounted in the front wall of the housing 82, and after passing through the inner space enclosed by the wedges 83 and 84 is deflected by means of a mirror 90 or the like upwardly through both wedges in succession and towards the viewing window 87. The latter, therefore, constitutes the test mark of varying brightness illuminated by the scene or object to be photographed, while the opaque adjacent area provided by the plate 82 (see Figure 3) represents the standard area and the wedges 83 and 84 are the light dimming elements for reducing the brightness of the window or test area 87 to become just barely visible or merge with the adjacent opaque area or surface.

In an arrangement of this type pre-setting of one exposure adjustment such as a certain exposure time to a desired value and subsequent control of the other adjustment so that the window 87 or any other mark provided in its place becomes just barely visible, will result in the proper setting of the shutter to insure a correctly exposed picture in a manner well understood and known to those skilled in the art.

According to the present invention, the size of the test mark or window 87 or its normal contrast relative to the surrounding area is made adjustable in accordance with one or more additional exposure controlling factors, such as film or emulsion speed and in particular the varying eye sensitivity to compensate for the error due to the latter in the final exposure adjustment. I have provided for this purpose in the example shown an adjustable member having a horizontal apertured plate or mask 91 arranged directly underneath the window 87 and an extension or scale plate 92 at right angle thereto and passing through a suitable guide slot in the housing 82. Plate 92 has an adjusting knob 93 and is provided with a scale 94 arranged to cooperate with a fixed scale 95 on the rear wall of the housing 82.

According to one embodiment as shown in Figure 13, mask 91 of the adjustable member has a single aperture 96 equal in size to the window 87, whereby displacement of the member will result in a variation of the window aperture and corresponding change in contrast in a manner understood from the above. In this manner by proper calibration of an adjusting scale on portion 92, additional exposure control factors, such as film speed or eye sensitivity, may be considered.

According to another embodiment as shown in Figure 14, mask 91 of the adjustable member is provided with three adjacent apertures 97, 98 and 99 of progressively decreasing size corresponding to bright, normal and dull surroundings marked on scale 94, whereby also to change the relative contrast of the test mark or window 87 for consideration of the varying eye sensitivity in substantially the same manner as in the preceding exemplifications. In the later case, scale 94 may represent the general lighting conditions, while scale 95 is appropriately calibrated in film speeds, whereby both the eye sensitivity and film speed may be considered by causing the proper graduation or numbers of the scales 94, 95 to the opposite each other. Other variations or modifications of the adjusting scales may be made and will be obvious to those skilled in the art.

It will be evident from the foregoing that the invention is not limited to the specific details, constructions and arrangements of parts shown and disclosed herein for illustration but that the underlying principle and inventive thought will be susceptible of numerous modifications and variations coming within the broader scope and spirit of the invention as defined in the appended claims. The specification and drawings are accordingly to be regarded in an illustrative rather than in a limiting sense.

I claim:

1. In a visual exposure meter, a light gauge element arranged to be illuminated by light emanating from a photographic object in the operative position of said meter, said light gauge element comprising at least one test area forming a viewing mark of predetermined configuration surrounded by a comparison area, one of said areas being opaque and the other being pervious to light, whereby the brightness contrast between said mark and surrounding area will be an index of the object brightness, means for visually determining and translating said brightness contrast into appropriate terms of exposure adjustment of a camera, and further means for varying the size of said mark in accordance with an additional variable exposure controlling factor.

2. In a visual exposure meter, a light gauge element comprising at least one light pervious test mark surrounded by a substantially opaque standard area and arranged to be illuminated by light emanating from a photographic object in the operative position of said meter, whereby the relative brightness contrast between said mark and area will be an index of the object brightness, means for visually equalizing said brightness contrast for determining and translating a given object brightness into appropriate terms of exposure adjustment of a camera, and further means for varying the size of said mark for considering an additional variable factor controlling the final exposure.

3. In a visual exposure meter, a light gauge element comprising at least one opaque test mark surrounded by a light pervious area and arranged to be illuminated by a light emanating from a photographic object in the operative position of said meter, whereby the relative brightness contrast between said mark and area will be an index of the object brightness, means for visually equalizing said brightness contrast for determining and translating a given object brightness into appropriate terms of exposure adjustment of a camera, and further means for varying the size of said mark in accordance with an additional variable exposure controlling factor.

4. In a visual exposure meter, a light gauge element arranged to be illuminated by light emanating from a photographic object in the operative position of said meter held at a distance from the observer's eye, said light gauge element comprising at least one test area forming a viewing mark of predetermined configuration surrounded by a comparison area, one of said areas being opaque and the other area being pervious to light, whereby the brightness contrast between said mark and surrounding area will be an index of the object brightness, means for visually equalizing said brightness contrast for determining and translating a given object brightness into appropriate terms of exposure adjustment of a camera, a scale representing general illumination conditions, and means in cooperative relation with said scale for varying the size of said mark to include a correction in the final exposure compensating for the effect on the brightness read due to the varying eye sensitivity under different general illumination to which the observer's eye is exposed.

5. In a visual exposure meter, a light gauge element comprising at least one light pervious test mark surrounded by a substantially opaque standard area and arranged to be illuminated by light emanating from a photographic object in the operative position of said meter held at a distance from the observer's eye, whereby the relative brightness contrast between said mark and area will be an index of the object brightness, means for visually equalizing said brightness contrast for determining and translating a given object brightness into appropriate terms of exposure adjustment of a camera, a scale representing general illumination conditions, and means in cooperative relation with said scale to vary the size of said mark to include a correction in the final exposure compensating for the effect on the brightness reading due to the varying eye sensitivity under different general illumination to which the eye is exposed.

6. In a visual exposure meter, a light gauge element arranged to be illuminated by light emanating from a photographic object in the operative position of said meter, said light gauge element having at least one test area forming a viewing mark of predetermined configuration and surrounded by a comparison area, one of said areas being opaque and the other area being pervious to light, whereby the brightness contrast between said mark and surrounding area will be an index of the object brightness, means for visually equalizing said brightness contrast to determine a given object brightness and for translating the brightness determined into appropriate terms of exposure adjustment of a camera, a scale representing values for an additional exposure controlling factor, and means in cooperative relation with said scale for varying the size of said marks to consider varying values of said additional factor in the final exposure.

7. In a visual exposure meter, a plurality of photometric wedge light gauge elements each having a series of adjacently situated test marks of progressively increasing relative density with respect to their surrounding areas, whereby the mark just barely visible upon illumination by light emanating from a photographic object in operative position of said meter will be an index of the object brightness, means for translating an object brightness read into appropriate terms of exposure adjustment of a camera, the size of the marks of each light gauge differing from the size of the marks of the other light gauges, a scale representing values of an additional exposure controlling factor, and means in cooperative relation with said scale for selectively placing said light gauges into operative position for individual use in said meter.

8. In a visual exposure meter, a plurality of light gauge elements each comprising a series of adjacently situated test marks of progressively increasing density surrounded by substantially opaque areas, whereby the mark just barely visible upon illumination by light emanating from a photographic object in the operative position of said meter is an index of the object brightness, means for translating an object brightness read into appropriate terms of exposure adjustment for a camera, the size of the marks of each light gauge differing from the size of the marks of the other light gauges, a scale representing values of an additional exposure controlling factor, and means in cooperative relation with said scale for selectively placing said light gauges in operative position for individual use in said meter.

9. In a visual exposure meter, a plurality of light gauge elements each comprising a series of adjacently situated test marks of progressively increasing relative density with respect to their surrounding areas, whereby the mark just barely visible upon illumination by light emanating from a photographic object in the operative position of said meter held at a distance from the observer's eye is an index of the object brightness, means for translating an object brightness read into appropriate terms of exposure adjustment of a camera, the size of the marks of each light gauge differing from the size of the marks of the other light gauges, a scale representing general illumination conditions, and means in cooperative relation with said scale for selectively placing said light gauges in operative position for individual use in said meter, whereby to include a correction in the brightness reading compensating for the effect due to the varying eye sensitivity under different general illumination to which the eye is exposed.

10. In a visual exposure meter, a plurality of light gauge elements each having a series of adjacently situated test numbers forming a brightness scale and being of progressively increasing density relative to their surrounding opaque areas, whereby the number just barely visible upon illumination by light emanating from a photographic object in the operative position of said meter held at a distance from the observer's eye is an index of the object brightness, means for translating an object brightness read into appropriate terms of exposure adjustment of a camera, the size of the numbers on each light gauge differing from the size of the numbers of the other light gauges, a scale representing general lighting conditions, and means in cooperative relation with said scale for selectively placing said light gauges in operative position for individual use in said meter, whereby to include a correction in the brightness readings compensating for the error due to the varying eye sensitivity under different general illumination to which the eye is exposed.

KARL RATH.